/ Patented Aug. 26, 1952

2,608,581

UNITED STATES PATENT OFFICE 2,608,581

PREPARATION OF N-(3,4-DIALKOXYPHEN-YLACETYL)-3',4'-DIALKOXYPHENALKYL-AMINES

Ferdinand B. Zienty, Brentwood, Mo., assignor to Monsanto Chemical Company, St. Louis, Mo., a corporation of Delaware No Drawing. Application December 30, 1949, Serial No. 136,171

18 Claims. (Cl. 260—559)

This invention relates to N-(3,4-dialkoxyphenylacetyl)-3',4'-dialkoxyphenalkylamines; more specifically, this invention relates to an improved process for the preparation of N-(3,4-dialkoxyphenylacetyl)-3',4'-dialkoxyphenalkylamines having the formula

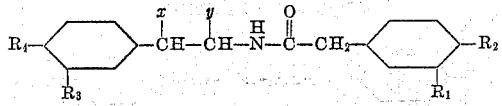

wherein $R_1$, $R_2$, $R_3$ and $R_4$ represent alkoxy radicals containing from 1 to 3 carbon atoms and $x$ and $y$ are selected from the group consisting of hydrogen and alkyl radicals, $x$ and $y$ together containing not more than 3 carbon atoms.

N-(3,4-dialkoxyphenylacetyl)-3',4'-dialkoxyphenalkylamines are intermediates in the preparation of various pharmaceuticals. Heretofore, N-(3,4-dialkoxyphenylacetyl)-3',4'-dialkoxyphenalkylamines have been prepared by reacting a 3,4-dialkoxyphenylacetic acid and a 3,4-dialkoxyphenalkylamine in an inert organic liquid medium at an elevated temperature. The reaction mixture thus obtained contained N-(3,4-dialkoxyphenylacetyl)-3',4'-dialkoxyphenalkylamines dissolved or suspended in the inert organic liquid medium. Recovery of the N-(3,4-dialkoxyphenylacetyl)-3',4'-dialkoxyphenalkylamines from this reaction mixture was usually carried out by stripping the inert organic liquid medium from the reaction mixture by distillation. The N-(3,4-dialkoxyphenylacetyl)-3',4'-dialkoxyphenalkylamine remaining after the removal of the inert organic liquid medium was then further purified in some convenient manner, such as by recrystallization from an aqueous alcoholic solution.

Carrying out a reaction in an inert organic liquid medium has several disadvantages. Unit production suffers inasmuch as a considerable portion of the reactor space is utilized by the inert organic liquid medium. Removal of the inert organic liquid medium from the reaction mixture obtained is always an added expense, both from the standpoint of the cost of the distillation process and the cost of that portion of the inert organic liquid medium which is usually lost in the process. The use of volatile and flammable inert organic liquid media also introduces a safety hazard.

It is an object of this invention to provide an improved process for the preparation of N-(3,4-dialkoxyphenylacetyl)-3',4'-dialkoxyphenalkylamines.

A further object of this invention is to provide an improved process for the preparation of N-(3,4-dialkoxyphenylacetyl)-3',4'-dialkoxyphenalkylamines wherein the use of an inert organic liquid medium is eliminated.

Further objects will become apparent from the description of the novel process of this invention.

It has now been discovered that unexpectedly high yields of substantially pure N-(3,4-dialkoxyphenylacetyl)-3',4'-dialkoxyphenalkylamines are obtained by reacting under reduced pressure, and in the absence of any liquid diluent, a 3,4-dialkoxyphenylacetic acid having the formula

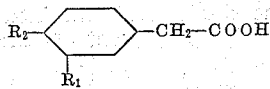

and a 3,4-dialkoxyphenalkylamine having the formula

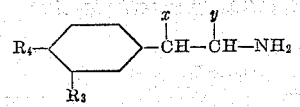

wherein $R_1$, $R_2$, $R_3$ and $R_4$ represent alkoxy radicals containing from 1 to 3 carbon atoms and $x$ and $y$ are selected from the group consisting of hydrogen and alkyl radicals, $x$ and $y$ together containing not more than 3 carbon atoms. According to a preferred embodiment of the novel process of this invention, the N-(3,4-dialkoxyphenylacetyl)-3',4'-dialkoxyphenalkylamines are prepared by heating a mixture of a 3,4-dialkoxyphenylacetic acid as above described and a 3,4-dialkoxyphenalkylamine as above described at an elevated temperature and under reduced pressure, while removing the water formed in the reaction. When the reactants are used in substantial equimolecular proportions, and the reaction carried to substantial completion, the reaction mixture thus obtained consists of substantially pure N-(3,4-dialkoxyphenylacetyl)-3',4'-dialkoxyphenalkylamine which unexpectedly, needs no further purification for most purposes. If desired, the N-(3,4-dialkoxyphenylacetyl)-3',4'-dialkoxyphenalkylamine may be further purified, for example, by recrystallization from an aqueous alcoholic solution.

According to the novel process of this invention, therefore, no inert organic liquid medium is needed in order to carry out the reaction. Unit capacity of process equipment is, therefore, more efficiently utilized, expensive recovery processes are not needed, unit production is significantly increased as a result of the reduced time cycle, and the hazard accompanying the use of flammable and volatile organic liquid media is eliminated. Surprisingly, significantly higher yields are obtained than is the case of prior processes referred to above.

The following examples are illustrative of the novel process of this invention, with all parts being by weight:

EXAMPLE I

*N-(3 - ethoxy - 4 - methoxyphenylacetyl)- 3'-ethoxy-4'-methoxyphenethylamine*

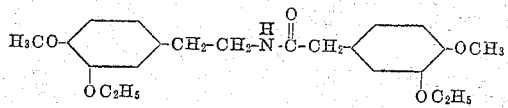

34.8 parts of 3-ethoxy-4-methoxyphenylacetic acid are charged to a reactor and heated to about 125° C. until the acid is completely melted. 32.3 parts of 3-ethoxy-4-methoxyphenethylamine are then added. The reactor is closed and the pressure reduced to about 10–20 mm. Hg absolute. The batch is heated at a temperature of about 145–155° C. for a period of about 3 hours, while removing under the reduced pressure the water formed during the reaction. At the end of this period the vacuum is released and the reaction mass allowed to crystallize. The reaction mass thus otained consists of substantially pure N-(3-ethoxy - 4 - methoxyphenylacetyl) -3'-ethoxy-4'-methoxyphenethylamine. The N-(3-ethoxy- 4 - methoxyphenylacetyl)- 3'-ethoxy - 4'-methoxyphenethylamine on recrystallization from an aqueous alcoholic solution is obtained in an 88% yield, having a melting point of 111.5–112.5° C. (corr.).

EXAMPLE II

*N-(3 - methoxy-4-ethoxyphenylacetyl) - 3',4'-dimethoxyphenethylamine*

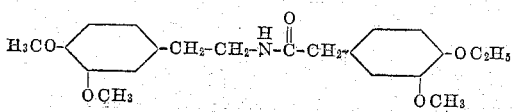

N-(3-methoxy - 4 - ethoxyphenylacetyl) -3',4'-dimethoxyphenethylamine is prepared according to the procedure described in Example I, utilizing the following reactants:

70 parts of 3,4-dimethoxyphenethylamine
81.2 parts of 3-methoxy-4-ethoxyphenylacetic acid N-(3-methoxy - 4 - ethoxyphenylacetyl) -3',4'-dimethoxyphenethylamine is obtained in a yield of about 80% having a melting point of 123.6°–124.1° C. (corr.).

EXAMPLE III

*N-(3 - ethoxy - 4 - methoxyphenylacetyl) -3',4'-dimethoxyphenethylamine*

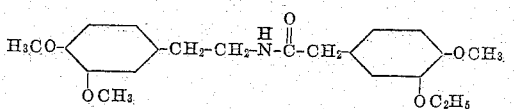

N-(3-ethoxy - 4 - methoxyphenylacetyl) -3',4'-dimethoxyphenethylamine is prepared according to the procedure set forth in Example I, utilizing the following reactants:

70 parts of 3,4-dimethoxyphenethylamine
81.2 parts of 3-ethoxy-4-methoxyphenylacetic acid N-(3-ethoxy - 4 - methoxyphenylacetyl)-3',4'-dimethoxyphenethylamine is obtained in about an 83% yield, having a melting point of 99.6°–100.6° C. (corr.).

EXAMPLE IV

*N -(3 - methoxy - 4 - ethoxyphenylacetyl)_ 3'-ethoxy-4'-methoxyphenethylamine*

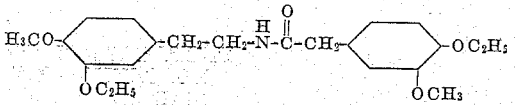

N-(3 - methoxy - 4 - ethoxyphenylacetyl)-3'-ethoxy-4'-methoxyphenethylamine is prepared according to the procedure described in Example I, utilizing the following reactants:

75.6 parts of 3-ethoxy-4-methoxyphenethylamine
81.2 parts of 3-methoxy-4-ethoxyphenylacetic acid N-(3 - methoxy - 4 - ethoxyphenylacetyl)-3'-ethoxy-4'-methoxyphenethylamine is obtained in about a 90% yield, having a melting point of 135°–136° C. (corr.).

EXAMPLE V

*N -(3,4 - dimethoxyphenylacetyl) - 3',4'- dimethoxyphenethylamine*

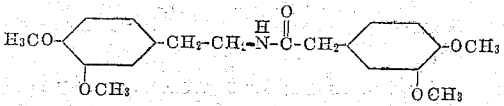

N-(3,4 -dimethoxyphenylacetyl) -3',4'-dimethoxyphenethylamine is prepared according to the procedure described in Example I, utilizing the following reactants:

70 parts of 3,4-dimethoxyphenethylamine
76 parts of 3,4-dimethoxyphenylacetic acid N-(3,4-dimethoxyphenylacetyl) -3',4'-dimethoxyphenethylamine is obtained in approximately a 90% yield, having a melting point of 124.1°–124.8° C. (corr.).

EXAMPLE VI

*N-(3-methoxy-4-ethoxyphenylacetyl) -1-(3',4'-dimethoxyphenyl) -2-propylamine*

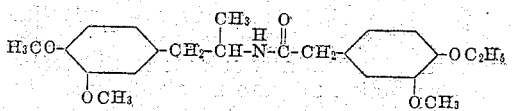

N - (3 - methoxy - 4 - ethoxyphenylacetyl) -1-(3',4'-dimethoxyphenyl) -2-propylamine is prepared according to the procedure described in Example I, utilizing the following reactants:

59 parts of 1-(3,4-dimethoxyphenyl) -2-propylamine
83 parts of 3-methoxy-4-ethoxyphenylacetic acid An excellent yield of recrystallized N-(3-methoxy-4-ethoxyphenylacetyl) -1-(3',4' - dimethoxyphenyl) -2-propylamine is obtained.

EXAMPLE VII

*N-(3-methoxy-4-ethoxyphenylacetyl)-2-(3',4'-dimethoxyphenyl) -3-butylamine*

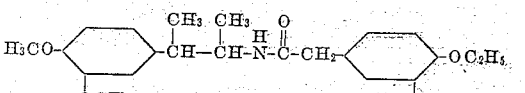

N - (3 - methoxy - 4 - ethoxyphenylacetyl)-2-(3',4'-dimethoxyphenyl) -3-butylamine is prepared according to the procedure described in Example I, utilizing the following reactants:

105 parts of 2-(3',4'-dimethoxyphenyl)-3-butylamine
105 parts of 3-methoxy-4-ethoxyphenylacetic acid An excellent yield of recrystallized N-(3-methoxy-4-ethoxyphenylacetyl)-2-(3',4'-dimethoxyphenyl)-3-butylamine is obtained.

EXAMPLE VIII

*N-(3-propoxy-4-methoxyphenylacetyl)-2-(3',4'-diethoxyphenyl)-3-pentylamine*

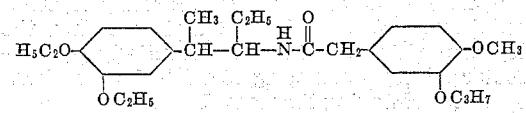

N-(3-propoxy-4-methoxyphenylacetyl)-2-(3',4'-diethoxyphenyl)-3-pentylamine is prepared according to the procedure described in Example I, utilizing the following reactants:

125 parts of 2-(3',4'-diethoxyphenyl)-3-pentylamine
112 parts of 3-propoxy-4-methoxyphenylacetic acid An excellent yield of recrystallized N-(3-propoxy-4-methoxyphenylacetyl)-2-(3',4'-diethoxyphenyl)-3-pentylamine is obtained.

The following compounds are illustrative of further compounds which may be prepared in accordance with the novel process of this invention as set forth in the preceding examples:

N-(3,4-diethoxyphenylacetyl)-3',4'-dimethoxyphenethylamine
N-(3,4-dimethoxyphenylacetyl)-3',4'-diethoxyphenethylamine
N-(3-methoxy-4-ethoxyphenylacetyl)-3'-methoxy-4'-ethoxyphenethylamine
N-(3-ethoxy-4-methoxyphenylacetyl)-3'-methoxy-4'-ethoxyphenethylamine
N-(3-methoxy-4-ethoxyphenylacetyl)-3',4'-diethoxyphenethylamine
N-(3-ethoxy-4-methoxyphenylacetyl)-3',4'-diethoxyphenethylamine
N-(3,4-diethoxyphenylacetyl)-3'-methoxy-4'-ethoxyphenethylamine
N-(3,4-diethoxyphenylacetyl)-3'-ethoxy-4'-methoxyphenethylamine
N-(3,4-dimethoxyphenylacetyl)-3'-methoxy-4'-ethoxyphenethylamine
N-(3,4-dimethoxyphenylacetyl)-3'-ethoxy-4'-methoxyphenethylamine
N-(3,4-diethoxyphenylacetyl)-3',4'-diethoxyphenethylamine
N-(3-propoxy-4-methoxyphenylacetyl)-3',4'-dimethoxyphenethylamine
N-(3-ethoxy-4-isopropoxyphenylacetyl)-3',4'-diethoxyphenethylamine
N-(3,4-dimethoxyphenylacetyl)-3',4'-dipropoxyphenethylamine
N-(3,4-dipropoxyphenylacetyl)-3'-propoxy-4'-methoxyphenethylamine
N-(3-propoxy-4-ethoxyphenylacetyl)-1-(3',4'-dipropoxyphenyl)-2-propylamine
N-(3,4-diethoxyphenylacetyl)-2-(3'-isopropoxy-4'-methoxyphenyl)-1-propylamine
N-(3,4-dimethoxyphenylacetyl)-2-(3',4'-diethoxyphenyl)-3-butylamine
N-(3-ethoxy-4-propoxyphenylacetyl)-1-(3'-methoxy-4'-ethoxyphenyl)-2-butylamine
N-(3-methoxy-4-ethoxyphenylacetyl)-2-(3',4'-dipropoxyphenyl)-1-butylamine
N-(3-ethoxy-4-methoxyphenylacetyl)-1-(3',4'-dimethoxyphenyl)-2-pentylamine
N-(3,4-diethoxyphenylacetyl)-2-(3',4'-dimethoxyphenyl)-1-pentylamine
N-(3,4-dipropoxyphenylacetyl)-3-(3',4'-diisopropoxyphenyl)-2-pentylamine
N-(3-methoxy-4-ethoxyphenylacetyl)-2-(3',4'-diethoxyphenyl)-3-pentylamine The procedure utilized in the preceding examples for the preparation of N-(3,4-dialkoxyphenylacetyl)-3',4'-dialkoxyphenalkylamines is subject to considerable variations. For example, the reaction temperature may be varied over a wide range. Best results, however, are obtained when the reaction temperature is maintained in the range of above the melting point of the reaction mixture and below 200° C., and preferably in the range of from about 100° C. to about 160° C. The reduced pressure maintained during the reaction may also be varied over a wide range. However, unexpectedly high yields of exceptionally pure amine product are obtained when the pressure is maintained below about 400 mm. Hg absolute and preferably below about 100 mm. Hg absolute. The quantities of the reactants utilized in the novel process of this invention are also subject to considerable variation. It has been found, however, that approximately equimolecular proportions of the reactants are most desirable. Therefore, in a preferred embodiment of this invention, approximately a 1 molecular proportion of 3,4-dialkoxyphenalkylamine is utilized for each molecular proportion of 3,4-dialkoxyphenylacetic acid.

What is claimed is:

1. In a process for the preparation of N-(3,4-dialkoxyphenylacetyl)-3',4'-dialkoxyphenalkylamines having the formula

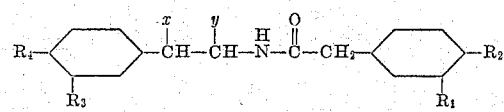

wherein $R_1$, $R_2$, $R_3$ and $R_4$ represent alkoxy radicals containing from 1 to 3 carbon atoms and $x$ and $y$ are selected from the group consisting of hydrogen and alkyl radicals, $x$ and $y$ together containing not more than 3 carbon atoms, the step comprising heating a substantially equimolecular mixture consisting of a 3,4-dialkoxyphenylacetic acid having the formula

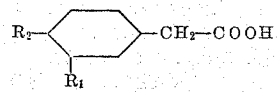

and a 3,4-dialkoxyphenalkylamine having the formula

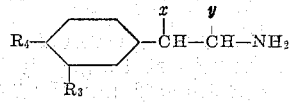

wherein $R_1$, $R_2$, $R_3$ and $R_4$ represent alkoxy radicals containing from 1 to 3 carbon atoms and $x$ and $y$ are selected from the group consisting of hydrogen and alkyl radicals, $x$ and $y$ together containing not more than 3 carbon atoms, at a temperature above the melting point of said mixture and below about 200° C., and under a reduced pressure of below about 400 mm. Hg absolute.

2. The process as defined in claim 1 wherein the 3,4-dialkoxyphenylacetic acid is 3-ethoxy-4-methoxyphenylacetic acid, and the 3,4-dialkoxyphenalkylamine is 3-ethoxy-4-methoxyphenethylamine.

3. The process as described in claim 1 wherein the 3,4-dialkoxyphenylacetic acid is 3-methoxy-4-ethoxyphenylacetic acid, and the 3,4-dialkoxyphenalkylamine is 3,4-dimethoxyphenethylamine.

4. The process as described in claim 1 wherein the 3,4-dialkoxyphenylacetic acid is 3-ethoxy-4-methoxyphenylacetic acid and the 3,4-dialkoxyphenalkylamine is 3,4-dimethoxyphenethylamine.

5. The process as described in claim 1 wherein the 3,4-dialkoxyphenylacetic acid is 3-methoxy-4-ethoxyphenylacetic acid and the 3,4-dialkoxyphenalkylamine is 3-ethoxy-4-methoxyphenethylamine.

6. The process as described in claim 1 wherein the 3,4-dialkoxyphenylacetic acid is 3,4-dimethoxyphenylacetic acid and the 3,4-dialkoxyphenalkylamine is 3,4-dimethoxyphenethylamine.

7. In a process for the preparation of N-(3,4-dialkoxyphenylacetyl)-3',4'-dialkoxyphenalkylamines having the formula

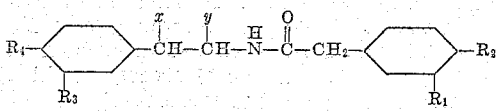

wherein $R_1$, $R_2$, $R_3$ and $R_4$ represent alkoxy radicals containing from 1 to 3 carbon atoms and $x$ and $y$ are selected from the group consisting of hydrogen and alkyl radicals, $x$ and $y$ together containing not more than 3 carbon atoms, the step comprising heating a substantially equimolecular mixture consisting of a 3,4-dialkoxyphenylacetic acid having the formula

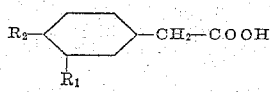

and a 3,4-dialkoxyphenalkylamine having the formula

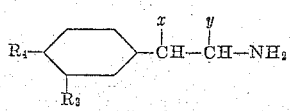

wherein $R_1$, $R_2$, $R_3$ and $R_4$ represent alkoxy radicals containing from 1 to 3 carbon atoms and $x$ and $y$ are selected from the group consisting of hydrogen and alkyl radicals, $x$ and $y$ together containing not more than 3 carbon atoms, at a temperature in the range of from about 100° C. to about 160° C., and under a reduced pressure of below about 400 mm. Hg absolute.

8. The process as defined in claim 7 wherein the 3,4-dialkoxyphenylacetic acid is 3-ethoxy-4-methoxyphenylacetic acid, and the 3,4-dialkoxyphenalkylamine is 3-ethoxy-4-methoxyphenethylamine.

9. The process as described in claim 7 wherein the 3,4-dialkoxyphenylacetic acid is 3-methoxy-4-ethoxyphenylacetic acid, and the 3,4-dialkoxyphenalkylamine is 3,4-dimethoxyphenethylamine.

10. The process as described in claim 7 wherein the 3,4-dialkoxyphenylacetic acid is 3-ethoxy-4-methoxyphenylacetic acid and the 3,4-dialkoxyphenalkylamine is 3,4-dimethoxyphenethylamine.

11. The process as described in claim 7 wherein the 3,4-dialkoxyphenylacetic acid is 3-methoxy-4-ethoxyphenylacetic acid and the 3,4-dialkoxyphenalkylamine is 3-ethoxy-4-methoxyphenethylamine.

12. The process as described in claim 7 wherein the 3,4-dialkoxyphenylacetic acid is 3,4-dimethoxyphenylacetic acid and the 3,4-dialkoxyphenethylamine is 3,4-dimethoxyphenethylamine.

13. In a process for the preparation of N-(3,4-dialkoxyphenylacetyl)-3',4'-dialkoxyphenalkylamines having the formula

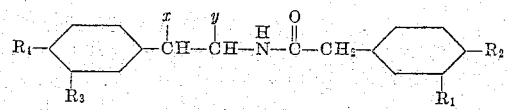

wherein $R_1$, $R_2$, $R_3$ and $R_4$ represent alkoxy radicals containing from 1 to 3 carbon atoms and $x$ and $y$ are selected from the group consisting of hydrogen and alkyl radicals, $x$ and $y$ together containing not more than 3 carbon atoms, the step comprising heating a substantially equimolecular mixture consisting of a 3,4-dialkoxyphenylacetic acid having the formula

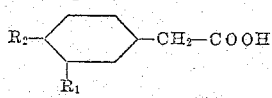

and a 3,4-dialkoxyphenalkylamine having the formula

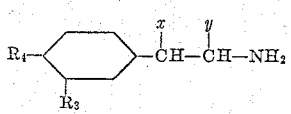

wherein $R_1$, $R_2$, $R_3$ and $R_4$ represent alkoxy radicals containing from 1 to 3 carbon atoms and $x$ and $y$ are selected from the group consisting of hydrogen and alkyl radicals, $x$ and $y$ together containing not more than 3 carbon atoms, at a temperature in the range of from about 100° C. to about 160° C., and under a reduced pressure of below about 100 mm. Hg absolute.

14. The process as defined in claim 13 wherein the 3,4-dialkoxyphenylacetic acid is 3-ethoxy-4-methoxyphenylacetic acid, and the 3,4-dialkoxyphenalkylamine is 3-ethoxy-4-methoxyphenethylamine.

15. The process as described in claim 13 wherein the 3,4-dialkoxyphenylacetic acid is 3-methoxy-4-ethoxyphenylacetic acid, and the 3,4-dialkoxyphenalkylamine is 3,4-dimethoxyphenethylamine.

16. The process as described in claim 13 wherein the 3,4-dialkoxyphenylacetic acid is 3-ethoxy-4-methoxyphenylacetic acid and the 3,4-dialkoxyphenalkylamine is 3,4-dimethoxyphenethylamine.

17. The process as described in claim 13 wherein the 3,4-dialkoxyphenylacetic acid is 3-methoxy-4-ethoxyphenylacetic acid and the 3,4-dialkoxyphenalkylamine is 3-ethoxy-4-methoxyphenethylamine.

18. The process as described in claim 13 wherein the 3,4-dialkoxyphenylacetic acid is 3,4-dimethoxyphenylacetic acid and the 3,4-dialkoxyphenalkylamine is 3,4-dimethoxyphenethylamine.

FERDINAND B. ZIENTY.

REFERENCES CITED

The following references are of record in the file of this patent:

UNITED STATES PATENTS

| Number | Name | Date |
|---|---|---|
| 1,941,647 | Wolfes | Jan. 2, 1934 |
| 1,962,224 | Wolf | June 12, 1934 |
| 1,990,453 | Hund et al. | Feb. 5, 1935 |

(Other references on following page)

FOREIGN PATENTS

| Number | Country | Date |
|---|---|---|
| 719,638 | France | Nov. 23, 1931 |

OTHER REFERENCES

Pictet et al.: "Ber. deut. chem.," vol. 42 (1902), p. 1986.

Barger et al.: "Ber. deut. chem.," vol. 66 (1933), pp. 450–461.

Schlitter et al.: "Ber. deut. chem.," vol. 66 (1933), pp. 988–995.

Buck et al.: "J. Chem. Soc." (London), vol. 125 (1924), p. 2183.

Tsatsas: "Comptes Rendus Acad. Sci.," vol. 229, July 18, 1949, p. 219.